United States Patent [19]

Schneider et al.

[11] 4,289,615

[45] Sep. 15, 1981

[54] FILTER MEDIA MOVER FOR PLATE TYPE FILTER

[75] Inventors: John R. Schneider, Belvedere; Joseph F. Mangione, San Rafael, both of Calif.

[73] Assignee: Russ Schneider & Associates, Tiburon, Calif.

[21] Appl. No.: 113,187

[22] Filed: Jan. 18, 1980

[51] Int. Cl.³ .............................................. B01D 29/02
[52] U.S. Cl. ..................................... 210/91; 210/386; 210/387
[58] Field of Search .................. 210/85, 91, 224, 227, 210/228, 230, 231, 386, 387, 398, 445, 324

[56] References Cited

U.S. PATENT DOCUMENTS 1,797,248 3/1931 Szegvari et al. ..................... 210/387
3,608,734 9/1971 Schneider .............................. 210/387

Primary Examiner—Ivars C. Cintins

Attorney, Agent, or Firm—Owen, Wickersham & Erickson

[57] ABSTRACT

A filter media supply and extraction apparatus for a plate type liquid filtering device having a stack of separable filter plates. The extraction mechanism comprises a driven roller for each sheet of filter media in combination with an adjacent, movable bar having a series of spaced apart pinch wheels mounted thereon for penetrating accumulated cake and filtered dirt on the media when an actuator moves them against the roller as the media is being advanced. The driven rollers are mounted on separate bearing plates which are movable in response to sensor signals to steer the moving filter media and maintain its alignment with the filter plates. The supply section of the apparatus comprises a series of supports for supply rolls of filter media provided with adjustable centering means to help maintain proper alignment of the filter media between filter plates.

11 Claims, 12 Drawing Figures

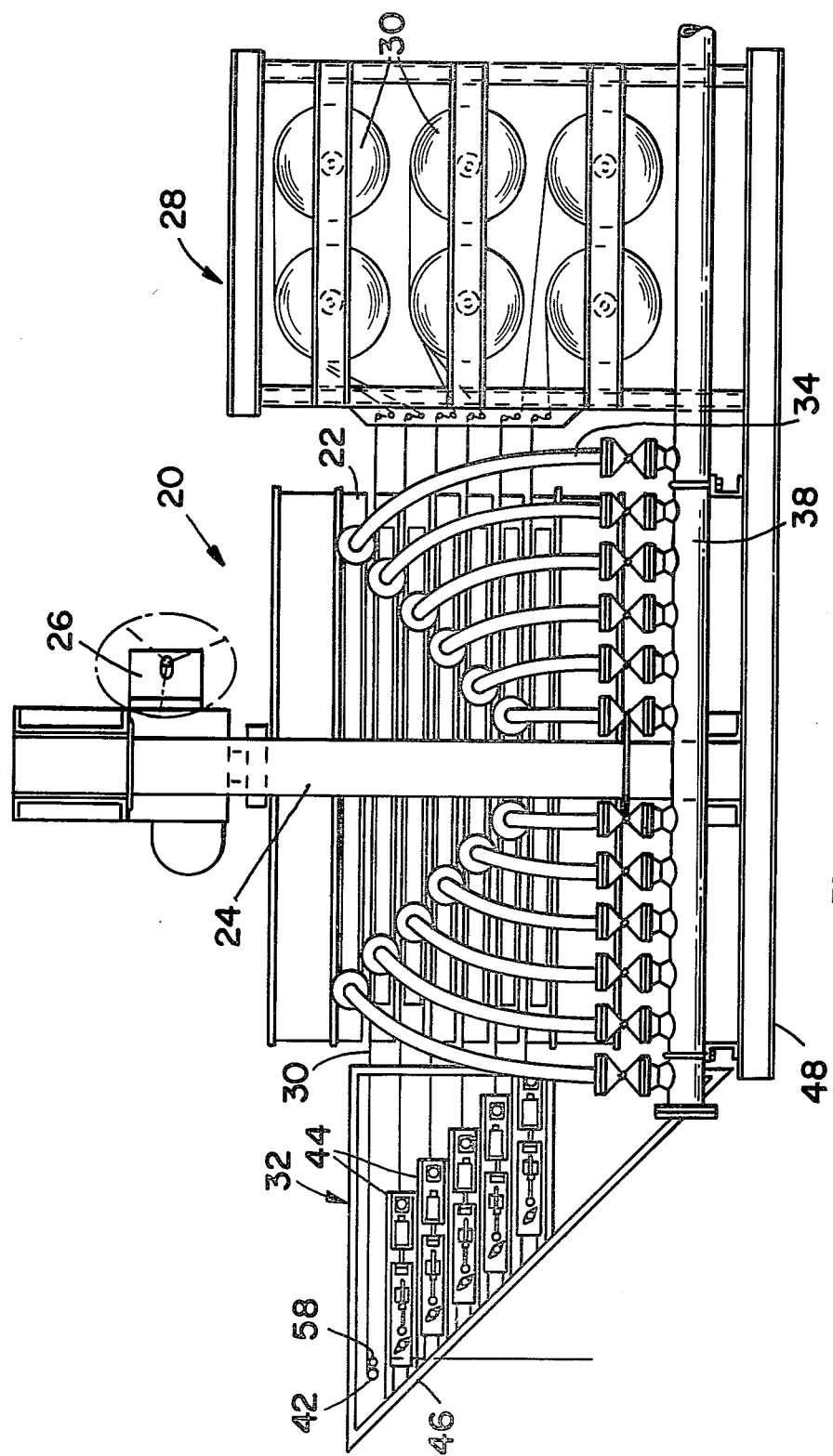
FIG_1

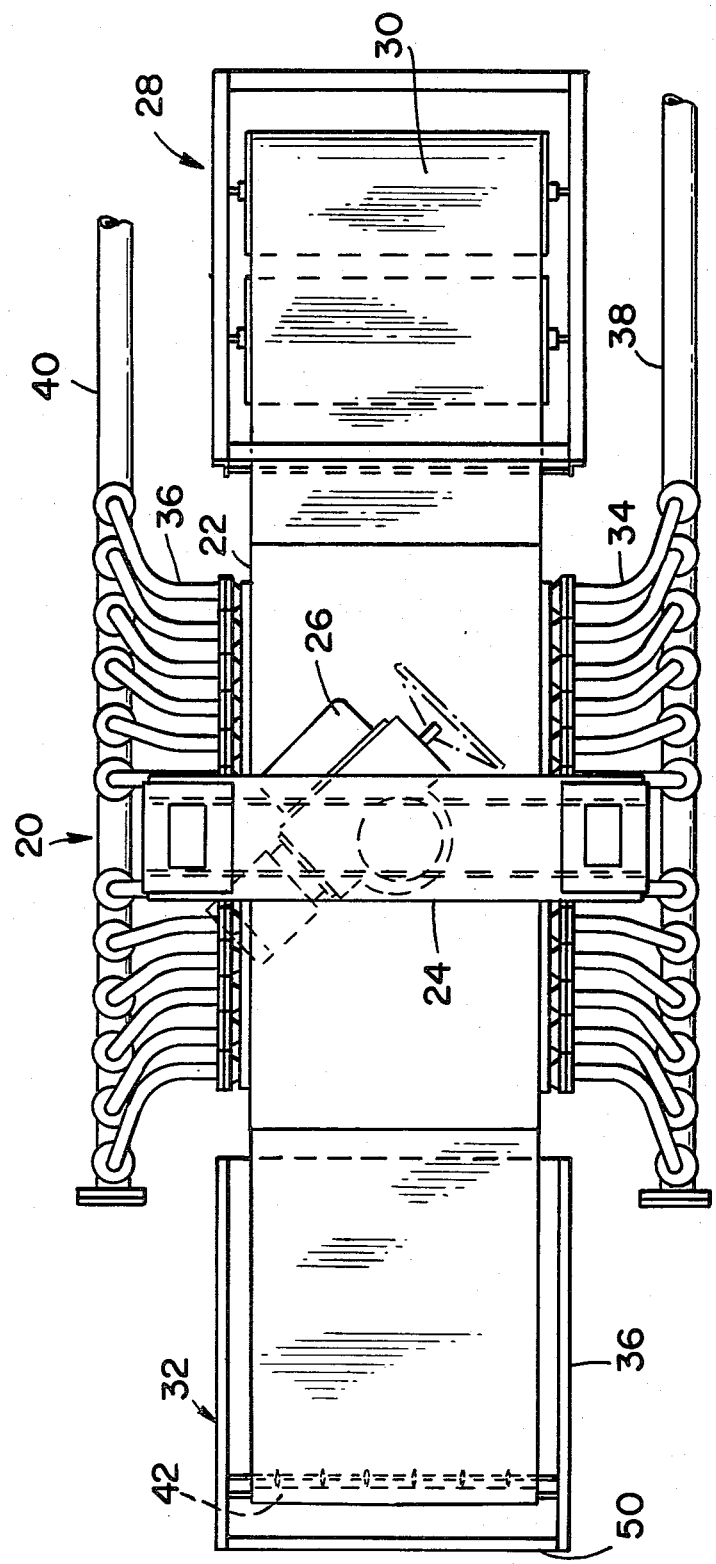
FIG_2

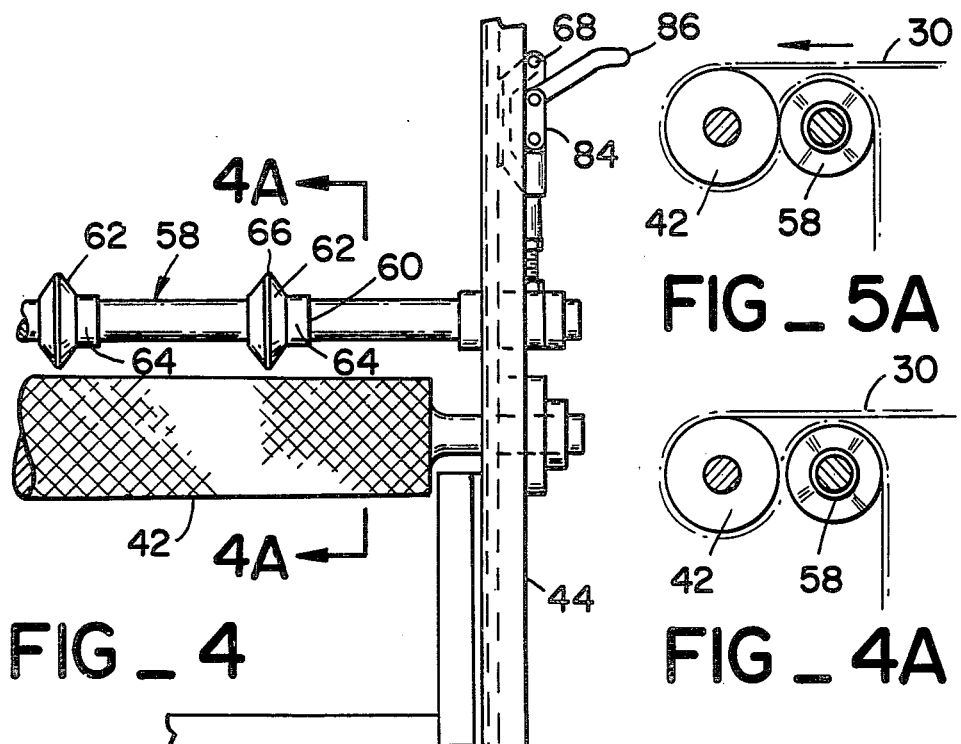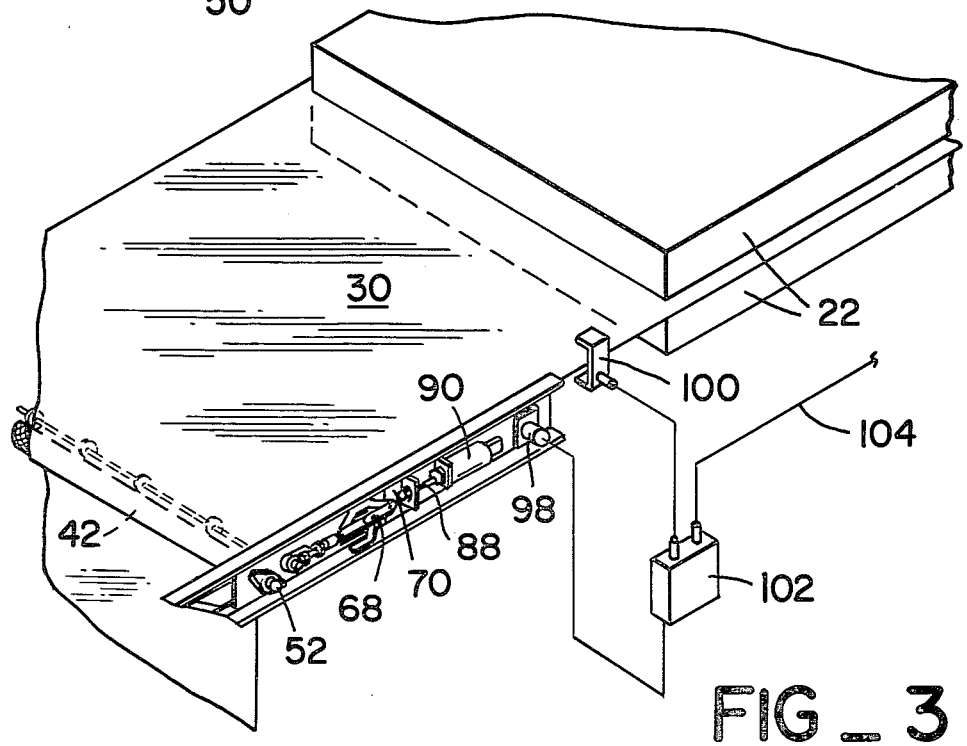

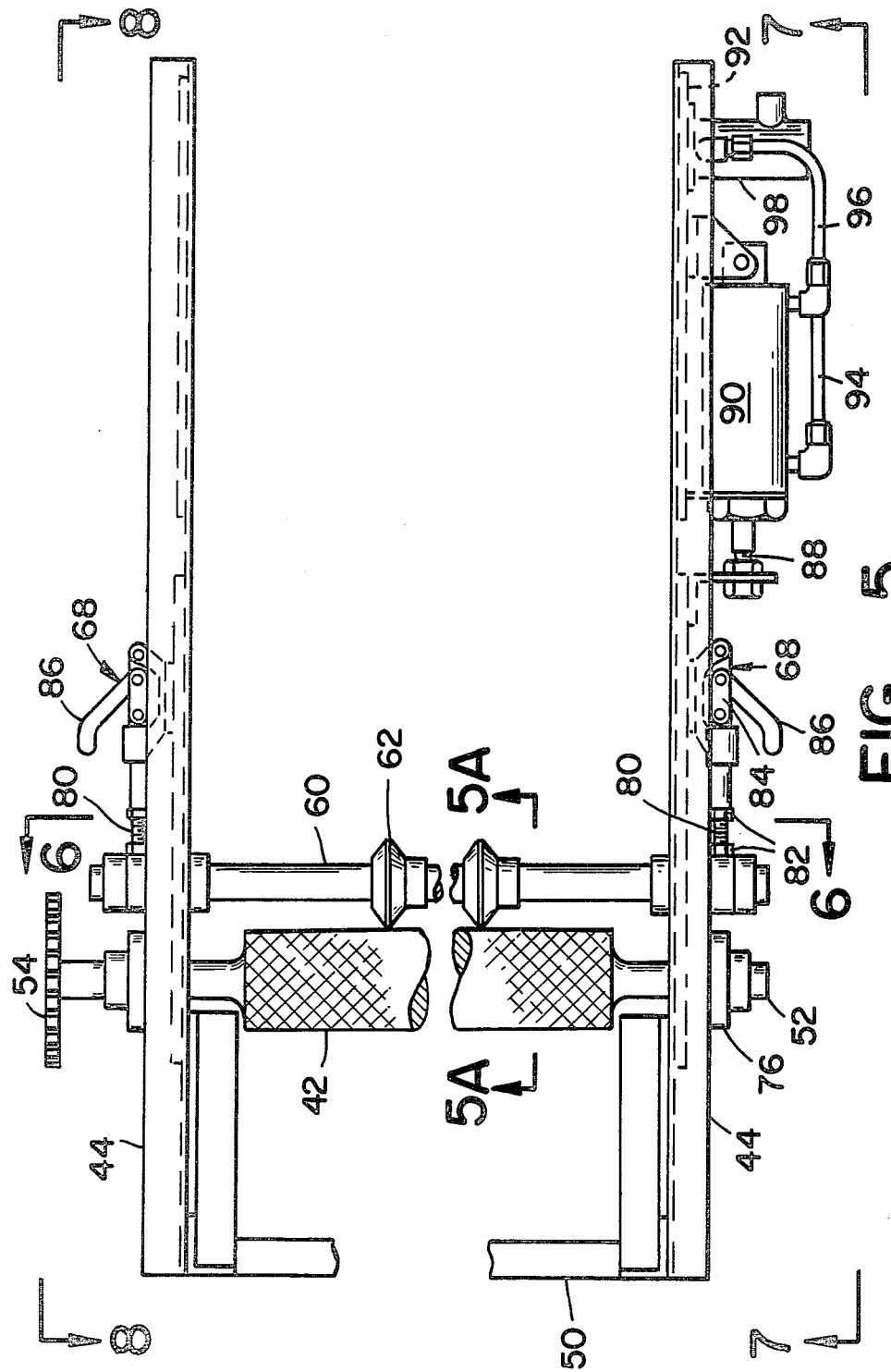

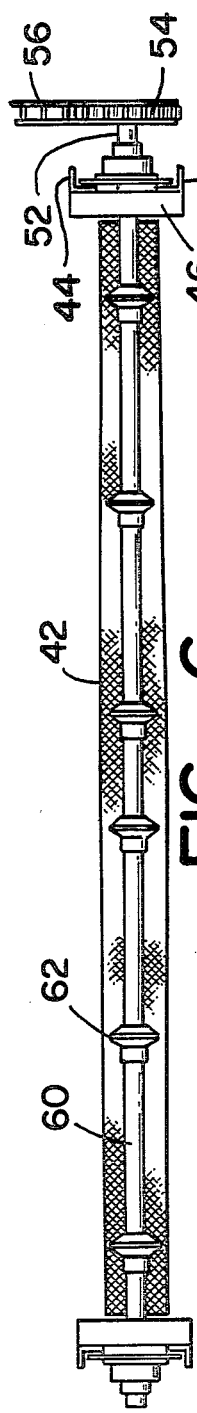
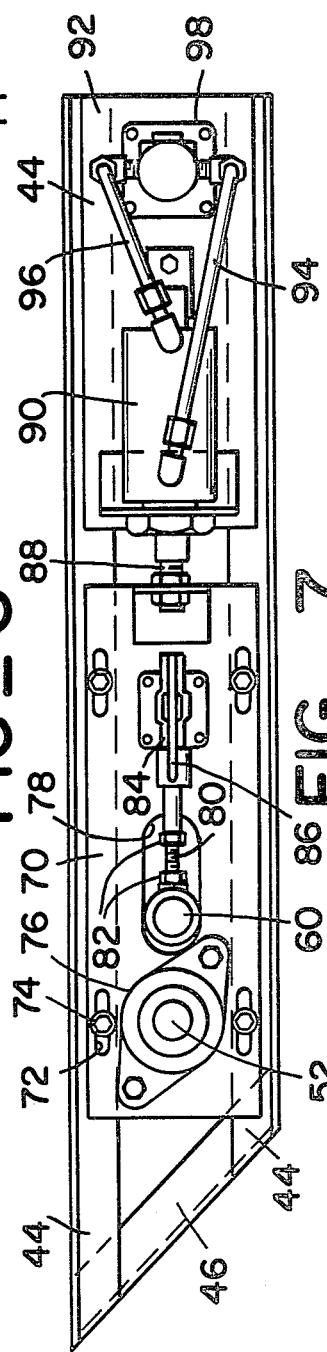
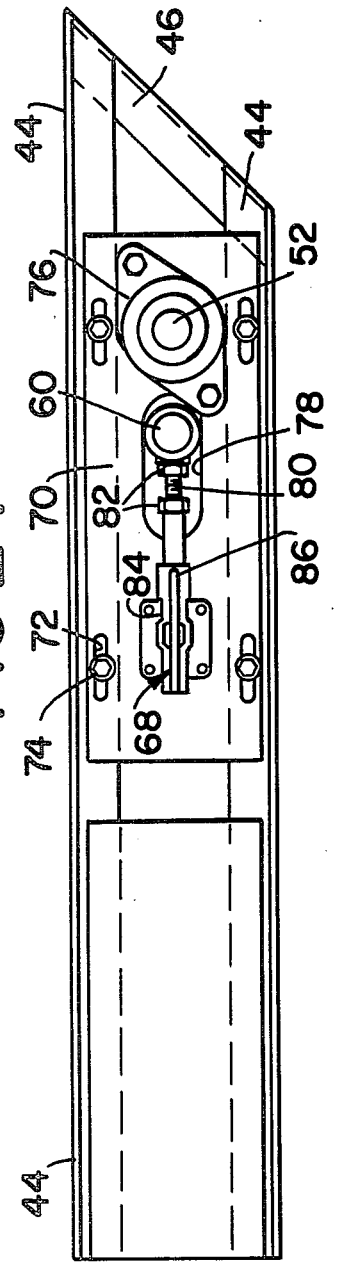

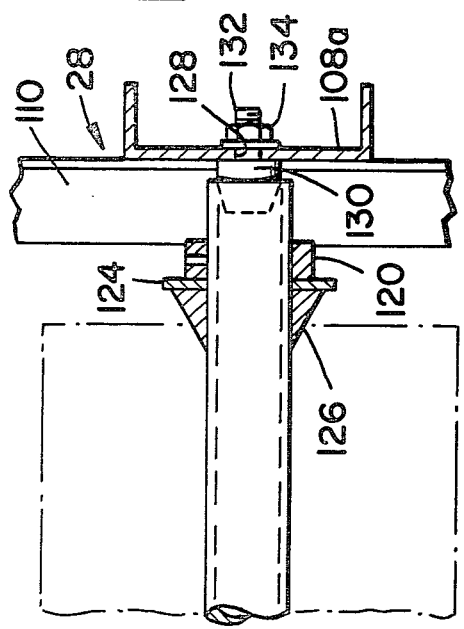
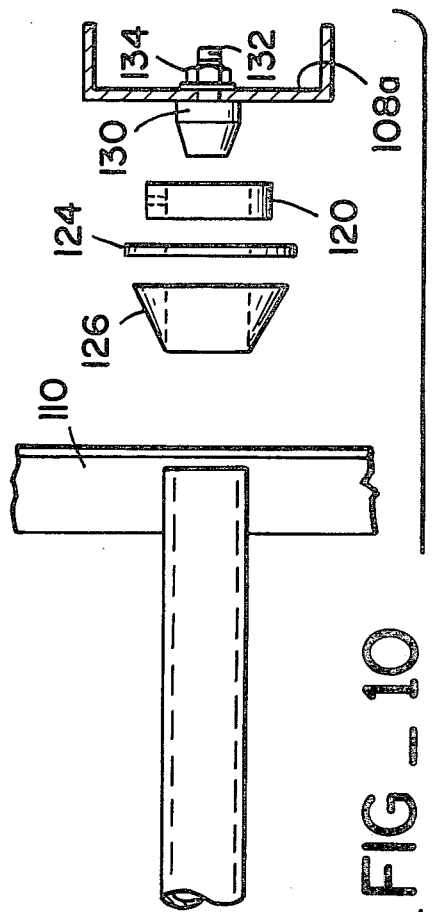
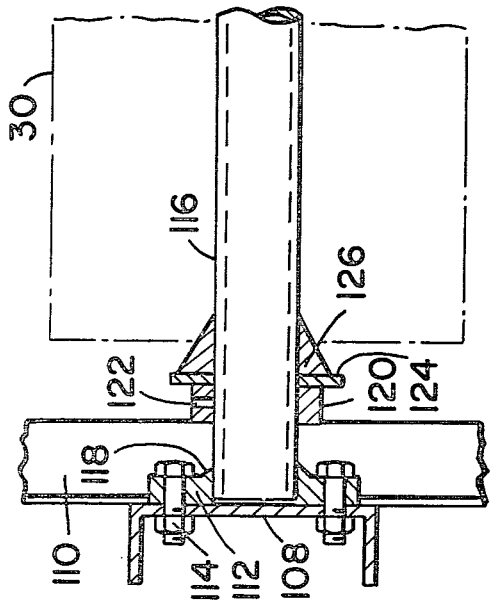
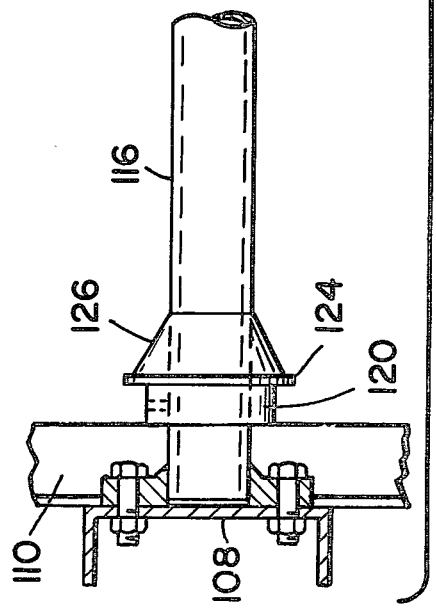

FILTER MEDIA MOVER FOR PLATE TYPE FILTER

BACKGROUND OF THE INVENTION

This invention relates to an improved liquid filtering apparatus of the separable plate type and more particularly, it relates to such a filtering apparatus in combination with an improved mechanism for supplying fresh filter media to, and removing used filter media from, the filtering apparatus.

In U.S. Pat. No. 3,608,734, a filtering apparatus is described wherein a series of horizontal plates are arranged in a stacked arrangement to form a series of inlet chambers for dirty liquid to be filtered. The plates are separable to an open position to allow placement of a sheet of filter media between them and when closed, they are sealed against the media around their edges to form an inlet chamber for each plate on one side of the media and, under a suitable grill, a collection chamber for clean, filtered liquid on the opposite side of the media. The inlet chambers are each connected to an inlet conduit for dirty liquid and the collection chambers are connected in parallel to a common conduit for clean filtrate.

In the aforesaid patent, filter media in the form of filter paper supplied from rolls located adjacent one side of the filter plates, is pulled between the plates by a media pulling apparatus adjacent the other side of the plates. The pulling apparatus includes a mechanism for inserting pins into the filter media to move it for a sufficient distance so that used filter media is completely removed from between each adjacent pair of separated filter plates and is replaced by fresh media before the plates are again closed. Heretofore, such an arrangement was particularly useful where additional filter media, such as diatomaceous earth, was added to, and allowed to build up, to form a cake on the filter paper media during a typical filtering cycle. As an alternative to the aforesaid patented pin-type media moving mechanism, it was suggested that the paper type filter media be pulled, using a crown roller in combination with a pinch roller, connected to a driving mechanism. Although such an expedient was operable to a limited degree with plain paper type filter media, it was not at all satisfactory for application where additional filter media was used to form a filter cake on the paper media or where an excessive buildup of filtered-out material occurred on the paper media. With such a thick layer of filter media, the filter cake or accumulated dirt, could not be passed between the crown roller and its pinch roll. Thus, the pinch roll could not hold the filter media against the crown roll so as to be driven satisfactorily and in many instances the media would track off to one side of the crown roll and prevent proper sealing of the media by the closing plates. Such erratic operation required continuous surveillance and manual adjustments and thus prevented the filter from being operated automatically and unattended for long periods of time.

A further problem with such plate type filters involving the filter media arose with respect to the necessity of providing a readily accessible paper supply, namely, the required rolls of paper media for the various pairs of filter plates. Not only was it necessary to provide means for quickly and easily replacing large paper rolls, but it was equally essential to provide a paper roll support means that would enable the paper to stay properly aligned relative to the plates during a media changing cycle. The present invention solves these and other problems associated with the filter media supply and removal system for plate type filters.

BRIEF SUMMARY OF THE INVENTION

In accordance with the principles of the present invention, a filter apparatus having a plurality of separable plates is provided in combination with a filter media moving device that can accommodate plain sheet type media or media with a relatively thick filter cake. For each sheet of filter media is a driven roller whose longitudinal axis is generally perpendicular to the direction of travel of the filter media and the center line of the plates. Instead of a conventional cylindrical pinch roller, a unique rotatable pinch means is provided which is also movable against the crown roller to engage the sheet media and cause it to press together against the drive roller even though the media may have on it a relatively thick layer of filter cake plus accumulated or filteredout material. The rotatable pinch means has a series of spaced apart disc-like members or pinch wheels, which can cut through the filter cake to press the sheet media against the drive roller to provide a firm, non-slipping driving contact, thereby enabling the drive roller, which is rotated by an appropriate power means, to pull and advance the media, removing used media from between separated filter plates and moving new media into place. The drive roller may be mounted so that its longitudinal axis can be adjusted angularly relative to its nominal position and this movement may be controlled automatically to assure accurate tracking of the new paper media between the filter plates as it is moved into position.

At the media supply side of the filter, rolls of paper media for the various pairs of plates are supported so as to be readily replaceable when required. Also, each roll is supported between self-adjusting bearing supports so that, once initially positioned, the paper media will continue to track in the proper direction of travel, relative to its pair of filter plates, when advanced.

In summary, a general object of the invention is to provide a plate type filtering apparatus with an improved filter media handling system that will operate efficiently even when the sheet type media has acumulated a relatively thick layer of filter aid cake and dirt.

Another object of the invention is to provide a filter media extractor using a drive roller in combination with a series of pinch wheels or discs that penetrate the layer or cake of filter aid on the media and provide the necessary friction to enable the crown roller to extract the old media and replace it with new media from the supply rolls.

Another object of the invention is to provide a plate type filter with a filter media supply and extraction system that is automatically adjustable to maintain proper alignment with the filter when being moved.

Still another object of the present invention is to provide a filter media handling system for a plate type filter that is easy to service and maintain with relatively unskilled labor.

A further object of the invention is to provide an improved arrangement for supporting a plurality of supply rolls of filter media for a plate type filter so that the media can be easily aligned with its extractor roll and maintain proper tracking between adjacent filter plates.

3

Other objects, advantages and features of the invention will become apparent from the following detailed description of one embodiment thereof presented in conjunction with the accompanying drawing.

BRIEF DESCRIPTION OF THE DRAWING

FIG. 1 is a view in side elevation of a filter with a filter media extraction and supply system according to the invention;

FIG. 2 is a top view of the filter of FIG. 1;

FIG. 3 is a fragmentary schematic view in perspective, showing a filter media extractor for a single pair of filter plates according to the invention;

FIG. 4 is a fragmentary plan view of the filter media handling system showing the pinch wheels retracted when new media is inserted;

FIG. 4A is a view in section taken along line 4A—4A of FIG. 4;

FIG. 5 is a fragmentary plan view of the filter media extractor according to the invention with central portions removed to conserve space;

FIG. 5A is a view in section taken along line 5A—5A of FIG. 5.

FIG. 6 is a view in section taken along line 6—6 of FIG. 5;

FIG. 7 is a view in section taken along line 7—7 of FIG. 5 and showing one side of the extractor assembly for one sheet of filter media;

FIG. 8 is a view in section taken along line 8—8 of FIG. 5 showing the other side of one extractor assembly;

FIG. 9 is a fragmentary view in section showing details of a supply roll for filter media; and FIG. 10 is an exploded view similar to FIG. 9, showing a supply roll with support collars removed at one end.

DETAILED DESCRIPTION OF EMBODIMENT

With reference to the drawing, FIGS. 1 and 2 show a filter apparatus 20 utilizing a filter media control mechanism embodying the principles of the present invention. As shown, the filter comprises a stack of horizontal plates 22 supported by a frame 24 and controlled by a mechanism including a power jack 26 for separating and closing the plates. On one side of the plates is a supply rack 28 for a series of rolls 30 of filter media and on the opposite side of the plates is an extractor mechanism 32 for removing used filter media and placing new media into position between plates. The filter media may be a suitable paper, of a type well known in the art, and a sheet from each supply roll extends between one pair of adjacent plates to the extractor mechanism. When the plates are closed together, inlet and outlet chambers are formed by the plates on opposite sides of the filter sheet so that dirty liquid fills the top or inlet chamber and clean filtrate collects in the bottom or outlet chamber. Details of the filter plates are not shown herein, since they are not essential to the present invention. Such plate details for a typical filter of this type are shown in U.S. Pat. No. 3,608,734. Suitable conduits or hoses 34 and 36, to and from each of these inlet and outlet chambers are connected to common or main inlet and outlet pipes 38 and 40, for the dirty liquid and the clean filtrate on opposite sides of the filter.

The extractor mechanism 32 comprises a series of drive rollers 42, one for each continuous sheet of filter media, extending between a particular pair of filter plates and from one of the supply rolls 30.

4

These drive rollers are supported by a frame which, in the embodiment shown in FIGS. 1 and 2, is made up of pairs of spaced apart horizontal members 44 connected at their outer ends by diagonal members 46 which slope downwardly toward the base support 48 for the filter plates and by cross-connecting members 50.

As best shown in FIG. 6, each drive roller 42 is generally an elongated cylinder whose diameter is preferably somewhat larger at its center and decreases slightly and symmetrically from this center to its opposite ends. Thus, in profile, each roller 42 has a convex curved surface, or a straight taper, between its ends and may be referred to as a crown roller. Also, each crown roller has a knurled or irregular surface that provides increased friction with the paper media wrapped around it and extending from its opposite ends are axles or shafts 52 which are supported in a pair of bearings on the extractor. At one end the axle 52 extends beyond its bearing and has a fixed sprocket 54 attached thereto which is driven by chain 56 from a suitable controllable power drive unit (not shown). All of the rollers are similarly connected to the chain so that they may be driven simultaneously by the power unit.

A single extractor section for one drive roller is shown somewhat schematically in FIG. 3 in order to illustrate certain features of the invention. Here is shown a sheet of the filter media 30 from a supply roll extending between a pair of plates 22 and partially wrapped around the crown roller 42 and then up and partially around a unique pinch wheel device 58. As shown in greater detail in FIGS. 4-6, this pinch wheel device comprises an elongated bar 60 to which is attached a series of adjustable disc-like pinch wheels 62 of equal diameter. Depending on the length of the bar, the number of pinch wheels may vary but for a crown roll of around 4 feet in length, four to six such pinch wheels are generally sufficient. Each pinch wheel has a relatively thick central hub portion 64 with a hole that forms a slidable fit with the bar so that the pinch wheel can be moved to any desired position along the bar and then be retained by a set screw (not shown). In cross-section, each pinch wheel tapers radially outwardly from its hub portion to a relatively narrow (e.g., 0.06-0.10 inches) outer edge 66. Thus, when a sheet of used filter media is being removed from the filter plates, and it has a layer or cake of collected filter material and dirt thereon, with a thickness of from 0.5 to 1.0 inches, the pinch wheels will cut through the cake to press the paper media firmly against the crown roller as they and the bar rotate freely.

The pinch bar and thus the pinch wheels 62 are controllable from a retracted, deactivated position, as shown in FIGS. 4 and 4A, to an engaged, operative position against the crown roller, as shown in FIGS. 5 and 5A. This movement from the deactivated position to the operative position may be accomplished by manually operated, two-position actuators 68 located at opposite ends of the pinch wheel bar, preferably of a type that is self latching in both positions.

In accordance with the invention, both the drive (or crown) roll 42 and its pinch wheel bar 60 for each sheet of filter media are supported by a pair of rectangular bearing plates 70 which are mounted on opposite pairs of horizontal frame members 44 of the extractor 32. On both sides of the extractor, as shown in FIGS. 7 and 8, each bearing plate 70 may be mounted so as to be movable for adjusting the position of its crown roll 42, as described below. Each plate itself is provided with four slots 72 near its corners and extending through each slot is a bolt or pin 74 fixed to a horizontal member of the extractor frame.

A flanged bearing assembly 76 for the end shaft 52 of the crown roll 42 is fixed to each plate 70 and adjacent thereto is a larger slot 78 for supporting one end of the pinch wheel bar 60. An end portion of this latter bar that extends beyond the slot is fixed to the threaded end of a movable rod 80 which is part of a two-position actuator 68 that is also fixed to the bearing plate 70. A pair of nuts 82 are provided on the threaded portion of the rod so that the position of the pinch wheel shaft or bar 60 relative to the adjacent crown roll 42, when the rod is fully extended, can be adjusted. In each clamp or actuator 68 the rod 80 is connected to an intermediate link 84 that is also fixed to a handle 86. Thus, in one position (when the filter media paper is being moved while the filter is not in operation or when the paper is held stationary during normal filter operations) the handle is as shown in the position of FIG. 5. When a new roll of filter paper must be installed when the filter is not in operation, the handle for the pinch wheel shaft is as shown in FIG. 4 with the pinch wheels separated from the crown roll so that the fresh media can be threaded between them.

In normal operation, each sheet of paper media, when initially centered properly on its crown roller, will remain centered as the crown roller rotates to remove used media and pull new media into position between the filter plates. However, in some instances where the filter is automatically controlled, an automatic paper centering system is used.

As stated above, the bearing plates 70 for each crown roller are adjustably mounted on their horizontal extractor frame members 44 but the bearing plates on one side of the extractor may also be separately movable in order to change the angular position of the crown roll relative to the horizontal central axis of the filter plates, if such a change is necessary to keep the filter media properly centered on the crown roll. Thus, as shown in FIG. 7, the inner end of each movable bearing plate 70 is connected to a linear acting shaft 88 of a controllable actuator 90 such as a pneumatic cylinder. In the embodiment shown, this cylinder is mounted on a plate 92 fixed to the horizontal frame members. Tubing connections 94 and 96 to opposite ends of the cylinder extend from a four-way solenoid valve 98, also fixed to the plate 92. As shown somewhat schematically in FIG. 3, this valve is connected to a suitable power source for the cylinder and it is controlled by signals from a sensor 100 on the extractor frame. Such signals are generated if, and when, the paper media tends to move from its proper direction of travel with respect to the crown roll. The sensor may be of a type that is commercially available, such as the type comprising essentially a pair of jaws between which the edge of the paper travels. A light source provided in one jaw section is aligned with a photocell in the opposite jaw and the sensor is positioned on the extractor so that deviation of the edge of the moving paper media from its normal path will interrupt the light directed to its photocell. When the paper media is traveling its true intended path between filter plates, the sensor 100 is not activated, but if for some reason the paper media starts to veer off course and moves further between its jaws so that the energy or light flowing to the sensor cell is interrupted, a signal is furnished to the photocell control unit 102 which is provided with power from a suitable source via a supply lead 104. The control unit then supplies a signal to the solenoid operated air valve 98 connected to a compressed air source (not shown) and having the two air lines 94 and 96 connected to opposite ends of the double acting, pneumatic actuator 90.

Only slight linear movement of the movable bearing plate 70 by the actuator 90 is required to change the angle of the crown roll axis sufficiently to provide the necessary steering of the paper media. As shown in FIG. 8, the bearing plate on the other end of the crown roll has no adjusting actuator and remains fixed at this time with the bolts 74 through its four slots 72 being firmly secured by appropriate fasteners. If an overall adjustment of the crown roll's position is required, these bearing plate bolts can be loosened and moved in either direction within the limitations of the slots.

At the media supply side of the filter plates, the rolls of filter media 30 are supported by the supply rack 28 and in a manner that helps to maintain proper media alignment with the filter plates. As shown in FIG. 1, the rack is comprised of horizontal frame members 108 that are fixed at their ends to vertical frame members 110. On one side of the rack, as seen in FIG. 9, horizontal frame members are permanently attached to the vertical members and on the other side they are removable to allow replacement of a filter media roll. Thus, on each permanently fixed horizontal member, is a series of spaced apart collars 112 secured to it by bolts 114. One end of a cylindrical roller 116 fits within each collar and is secured thereto by suitable means, such as a circular weldment 118 so that it is cantilevered toward the other side of the rack.

On the inner end of each roller is an adjustable, annular retainer collar 120 with a set screw 122 to hold it in place, a washer 124 and a conical collar 126 that tapers to the surface of the roller. At the outer end of the roller is a similar conical collar, washer and adjustable retainer collar. The removable horizontal frame member 108a which is attached by removable fasteners (not shown) to the frame members, is provided with spaced apart holes 128 in order to support the rollers 116 extending from the opposite, fixed horizontal member. A frusto-conical plug 130 is provided for each roller and has a threaded stud portion 132 that extends through a hole. This plug fits within the free end of a roller to provide support and is retained by a nut 134 threaded to the stud portion on the opposite side of the horizontal member. Thus, when it becomes necessary to install or replace a roll of filter media, the procedure is simple and straightforward. As shown in FIG. 9, the appropriate horizontal member 108a is first removed, at least at one end, so that it can be moved out of the way. The outer washer 124, cone 126, and collars 120 are also removed. A paper media roll can then be placed on a cantilevered roller 116 with both inner and outer tapered collars 126 adjusted to the proper position to align the paper media accurately with the filter plates. The outer washer 124 and collar 120 are then placed on the roller and the horizontal member is attached and bolted into place after the plug 130 is placed within the open end of the roller.

From the foregoing, it should be apparent that the present invention provides an improved plate type filter with an efficient, but relatively simple, filter media handling system. The system will operate reliably even though the sheet-type filter media has a substantial layer or cake of filter aid or dirt because the pinch wheels can penetrate the cake and provide the necessary friction on the driving crown roller. The crown roller will normally maintain the media on its proper alignment relative to the filter papers, aided in part by the self-adjusting manner in which the supply rolls are supported. If, for some reason, the media may tend to veer to one side during a retraction cycle, the position of the crown roller will be automatically adjusted by the sensor/actuator system of the invention to move back into proper alignment.

Although a filter unit with plates for six sheets of filter media (with six extractor units 32) are shown, it should be apparent that the invention is also applicable to a filter with more or less filter plates and accompanying extractor units. Thus, another important advantage of the present invention is that the compact arrangement and unique arrangement of crown roll and pinch wheel components with their adjustment and control elements, enables additional such extractor units to be easily installed along with additional filter plates if increased capacity of the filter apparatus is desired.

Thus, to those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In combination with a liquid filtering device comprising a plurality of filter plates which, when placed together, form liquid containers, means for moving said plates together for retaining elongated sheets of flexible filter media between adjacent plates, thereby forming a pair of fluid-tight chambers on opposite sides of each sheet, there being an inlet to one chamber and an outlet to the opposite chamber on the other side of the sheet, and means for separating the plates when the sheets of filter media are contaminated, a sheet extraction and advancing means for the various sheets of filter media adjacent the filtering device comprising:

a frame;

an elongated drive roller for each sheet of filter media supported by said frame and extending generally perpendicular to the longitudinal center line of the media, each said drive roller being a crown roll with a slightly greater diameter at its midpoint than at its ends;

controllable power means for rotating each said drive roller;

a freely rotatable bar adjacent each said drive roller and a plurality of rotatable pinch wheels mounted on said bar;

means for urging each said bar towards its adjacent roller when said power means is activated so that said pinch wheels will press against the filter media which is partially wrapped around said roller, thereby causing a frictional force between said roller and said media that is sufficient to advance the media when said power means is activated, said latter means including means for retracting each said bar away from its adjacent roller when filter media is initially installed and said power means is deactivated.

2. The filter sheet advancing means as described in claim 1, wherein said pinch wheels are circular discs with a central hub portion that are axially adjustable on said bar, each said disc having a tapered peripheral edge for penetrating accumulated filter cake on the media.

3. The filter sheet advancing means as described in claim 1, wherein each said drive roller has a knurled outer surface.

4. The filter sheet advancing means as described in claim 1, including in further combination, a fixed bearing means for supporting one end of each said drive roller and a movable bearing means for supporting the other end of said roller; and means for adjusting the position of said movable bearing means in order to vary the angular position of the roller axis relative to the fixed orientation of said adjacent filter plates to thereby keep the filter media centered on said roller and between the filter plates as it is advanced by said power means.

5. The filter sheet advancing means as described in claim 4, wherein said means for adjusting the position of said movable bearing means comprises a media alignment sensing means for providing signals when the media travel varies from a preselected path;

linear actuator means connected to said movable bearing means; and means for operating said actuator means in response to signals provided by said media alignment sensing means.

6. The filter sheet advancing means as described in claim 4, wherein said movable bearing means comprises a movable mounting plate on one side of said frame, a self-aligning bearing fixed to said mounting plate, said actuator means having a movable arm connected to such mounting plate.

7. The filter sheet advancing means as described in claim 6, wherein said movable bearing means comprises a slot for retaining one end of said pinch wheel bar.

8. The filter sheet advancing means as described in claim 7, wherein said means for urging said bar towards its adjacent roller comprises a linearly movable member engaging said bar and connected by linkage means fixed to said bearing plate and to a manually controllable handle.

9. The filter sheet advancing means as described in claim 6, wherein said fixed bearing means includes a bearing plate similar to said movable bearing plate but retained in a fixed position on said frame.

10. The filter sheet advancing means as described in claim 1 in combination with filter media supply means adjacent the opposite ends of said plurality of filter plates, said supply means comprising:

a support frame having vertical frame members, fixed horizontal members on one side and removable horizontal members on its other side;

a series of elongated supply roll support members fixed at one end to said fixed horizontal members of said frame and supported at their other ends by said removable horizontal members;

adjustable means on each roll support member for supporting a roll of filter media in proper alignment with said filter plates.

11. The filter sheet advancing means as described in claim 10, wherein said adjustable means comprises a pair of annular retaining rings with means for attaching them at a fixed location along a said support member, and a conical collar adjacent each said retaining ring for supporting a roll of filter media.

* * * * *